United States Patent [19]

Hespelt et al.

[11] Patent Number: 5,031,197
[45] Date of Patent: Jul. 9, 1991

[54] TIMING ERROR DETECTOR

[75] Inventors: Volker Hespelt; Thomas Alberty, both of Backnang, Fed. Rep. of Germany

[73] Assignee: Ant Nachrichtentechnik GmbH, Backnang, Fed. Rep. of Germany

[21] Appl. No.: 423,391
[22] PCT Filed: Jan. 16, 1988
[86] PCT No.: PCT/DE88/00021
§ 371 Date: Sep. 11, 1989
§ 102(e) Date: Sep. 11, 1989
[87] PCT Pub. No.: WO88/07303
PCT Pub. Date: Sep. 22, 1988

[30] Foreign Application Priority Data

Mar. 11, 1987 [DE] Fed. Rep. of Germany ....... 3707763

[51] Int. Cl.$^5$ .......................... H04L 27/06; H04B 1/30
[52] U.S. Cl. ...................................... 375/97; 375/106; 455/260
[58] Field of Search .................... 375/14, 77, 97, 106, 375/120; 455/202, 260, 324; 329/306, 307, 308, 358, 360, 361

[56] References Cited

U.S. PATENT DOCUMENTS

| 3,745,255 | 7/1973 | Fletcher | 329/308 |
| 4,336,500 | 6/1982 | Attwood | 329/300 |
| 4,419,759 | 12/1983 | Poklemba | 329/360 |
| 4,538,111 | 8/1985 | Giusto | 329/308 |
| 4,726,043 | 2/1988 | Levesque | 375/97 |

FOREIGN PATENT DOCUMENTS 3707762 9/1988 Fed. Rep. of Germany .

OTHER PUBLICATIONS

Proceedings of the IEEE; vol. 71, No. 6, Jun. 1983, pp. 754–766, "Frequency-Selective Scintillation Effects and Decision Feedback Equalization in High Data-Rate Satellite Links", Bogusch, Guigliano and Knepp.

Primary Examiner—Benedict V. Safourek
Attorney, Agent, or Firm—Spencer & Frank

[57] ABSTRACT

The invention relates to a timing error detector for clock pulse synchronization in a receiver for synchronous data transmission. The timing error detector receives, as the demodulated received signal, the in-phase component and the quadrature component from the product of the received signal with the output signal of the carrier oscillator, with these components being lowpass filtered so that the signal terms of the double frequency are suppressed. The output signal serves as control signal $u_{TI}$ for the clock pulse generator. The timing error detector includes two bandpass filters fed with the demodulated received signal and a linkage circuit which generates the control signal from the complex bandpass output signals. The detector is characterized in that a further linkage circuit VF is provided which generates a control signal $u_f$ to control the frequency of the carrier oscillator from the complex output values of bandpass filters BP+ (FIG. 4).

8 Claims, 6 Drawing Sheets

TIMING ERROR DETECTOR

BACKGROUND OF THE INVENTION

The invention relates to a detector for use in synchronizing a clock pulse generated by a clock pulse generator in a receiver of synchronously transmitted data, which includes a pair of bandpass filters for respectfully receiving an in-phase component and a quadrature component of a demodulated received signal generated in the receiver from product of a received signal and an output signal of a carrier oscillator, harmonics of the in-phase and quadrature components being suppressed, and a combiner unit which is responsive to outputs signals of bandpass filters for generating a control signal to control the timing of the clock pulse generator.

Such timing error detectors (see FIGS. 1 and 2) are known, for example, from the articles cited below.

In connection with synchronous data transmission, it is important for the receiver to derive the precise sampling moment from the received data. For this purpose, a timing error detector TD (FIGS. 1, 2) generates by way of non-linear operations an output signal $u_T$ whose fundamental mode corresponds to the clock pulse frequency and whose zero passages permit the derivation of the sampling moment. The clock pulse oscillation is freed of interferences by means of narrowband filtering through a bandpass filter or a phase control loop (PLL).

If the transmission takes place in the carrier frequency domain, in addition to the clock pulse, the carrier frequency and carrier phase must also be synchronized in the receiver. This produces acquisition problems if the carrier frequency offset is great compared to the bandwidth of the carrier phase control loop. One possibility to synchronize the carrier phase control loop is to employ a frequency control loop in addition to the carrier phase control loop. In this connection reference is made to German Published Patent Application 3,707,762.

Thus, in addition to the carrier phase control loop for synchronization of the carrier phase, which will not be discussed in detail here, the receiver requires a frequency detector for the frequency control loop and a timing error detector TD for clock pulse control. Timing error detectors, for QPSK (quadrature phase shift keyed) signals are described in the article by Gardner entitled "A BPSK/QPSK Timing-Error Detector For Sampled Receivers", IEEE Com.-34, No. 5, May 1986, pages 423-429 (Reference 1) and in the article by Godard entitled "Passband Timing Recovery In All-Digital Modem Receiver," IEEE Com.-26, No. 5, May 1978, pages 517-523 (Reference 2).

SUMMARY OF THE INVENTION

It was the object of the invention to provide a timing error detector of the above-mentioned type which, without requiring much additional circuitry, can simultaneously be used as a frequency detector, with the detectors operating substantially independently of one another and furnishing output signals that are as free of jitter as possible.

The solution of this problem is to provide a second linkage circuit which generates from the complex output values of the bandpass filters a control signal to control the frequency of the carrier oscillator.

The detector circuit according to the invention has the following advantages: with little additional expense it can simultaneously be used as a frequency detector, with the additional circuitry expenditures resulting from the provision of a further linkage circuit (combiner unit) which generates the desired control signal. The two detectors operate substantially independently of one another and furnish output signals which are very poor in jitter. The acquisition time is greatly reduced by the detector circuit according to the invention.

With suitable pre-equalization before bandpass filtering, the jitter component in the phase detector as well as in the frequency detector can be reduced almost to zero. The independent operation of the two detectors resides in the fact that the frequency detector is independent of the timing error offset and the timing error detector is substantially independent of the frequency offset of the demodulated signal; thus the output signals of the two detectors are decoupled. Another advantage is that small delays result in the control loop since the detectors include, instead of data filters as in the cited Reference 1, inexpensive bandpass filters and possibly pre-equalizers.

There additionally exists the possibility that, with digital realization of the detectors, the sampling frequency in the bandpass filters and possibly in the pre-equalizers may be selected independently of the sampling frequency in the data filters. Customarily an integer multiple of the reciprocal of the stepping clock pulse is selected.

By means of a third linkage circuit (combiner unit) it is possible to generate a complex output signal to actuate the timing error control. This complex control value is able to reduce the acquisition time significantly during clock pulse regulation.

BRIEF DESCRIPTION OF THE DRAWINGS

The invention will now be described with reference to the drawing figures.

FIGS. 1 to 3 show the state of the art.

FIGS. 1 and 2 show a block circuit diagram of a receiver component for the demodulation of the received signal including a timing error detector, the latter being shown in greater detail in FIG. 2.

FIG. 4A shows the detector circuit coupled to the carrier oscillator and clock pulse generator, with FIGS. 5a, 5b and 5c showing in detail the linkage circuits for the frequency detector and the timing error detector.

DESCRIPTION OF THE PREFERRED EMBODIMENTS

Figure 1:
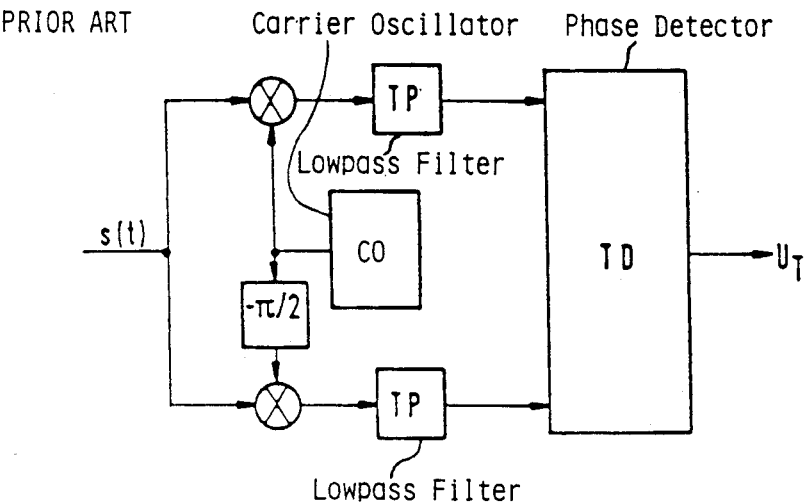

FIG. 1 shows the demodulation circuit of a receiver in which the received signal s(t) is multiplied once directly and once with a phase shift of $-\pi/2$ with a carrier signal generated by a carrier oscillator. Thereafter the signal is filtered in lowpass filters TP which suppress cross products of twice or higher multiples (harmonics) of the carrier frequency, and is fed, as in-phase component x(t) and quadrature component y(t) of the demodulated input signal, as an input signal to a timing error detector TD which generates a control signal $u_T$ for actuating a timing error adjustment device for a sampler. This output signal $u_T$ has a fundamental mode which corresponds to the clock pulse frequency. After further filtering, the zero passages of this fundamental mode are employed to determine the sampling moments. So much regarding the evaluation of control voltage $u_T$; further information about clock pulse regulation can be found in the cited References 1 and 2.

Figure 2:
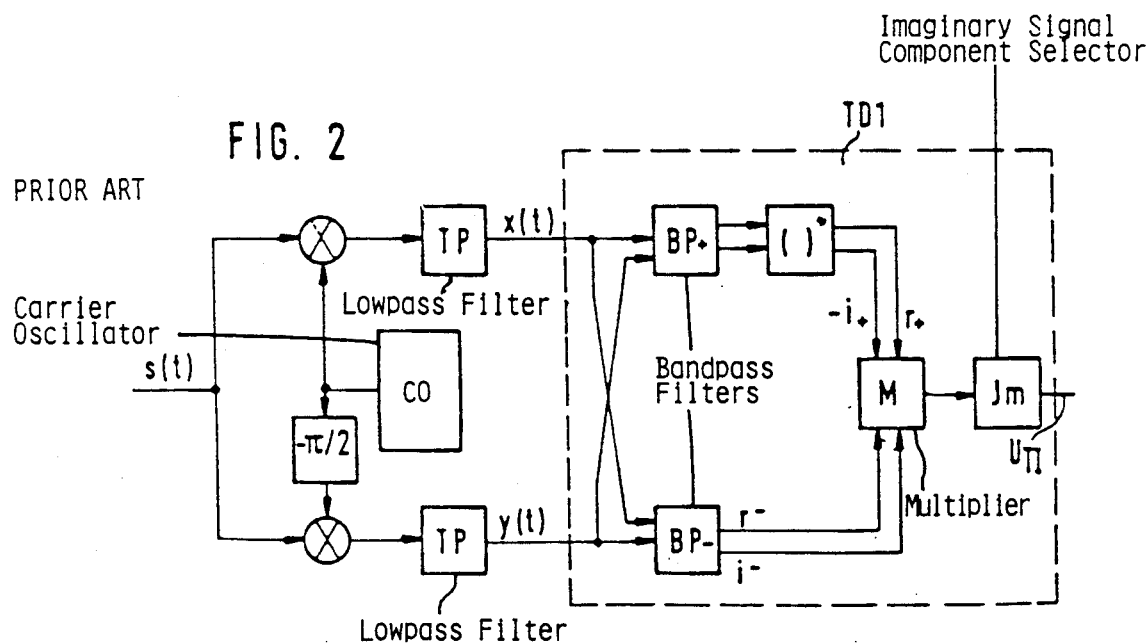

FIG. 2 shows the detailed circuit diagram of a timing error detector TD1 which is described in Reference 2 and is used if, instead of the phase splitter network employed in Reference 2, a QPSK signal is demodulated.

The normal in-phase component x(t) and the quadrature component y(t) of the demodulated received signal $z(t)=x(t)+jy(t)$ are each fed to a complex bandpass filter BP+ having a center frequency $f_M=f_{Nyq}$ and to a complex bandpass filter BP− having the center frequency $f_M=-f_{Nyq}$, with $f_{Nyq}$ being the Nyquist frequency at $f_{Nyq}=\frac{1}{2}T_S$ and a step duration $T_S$ for the transmitted symbols. The conjugated complex output signal of the first bandpass filter BP+ including the real component r+ and the imaginary component −i+ is subsequently multiplied in a multiplier M with the real component r− and the imaginary component i− of the output signal of the second bandpass filter BP−. The output signal of the multiplier M is therefore a complex signal $u_{TU TR}+ju_{T1}$. The imaginary component of the multiplier output signal is selected by module in and constitutes the output signal $u_{TI}$ of timing error detector TD1.

Figure 3A:
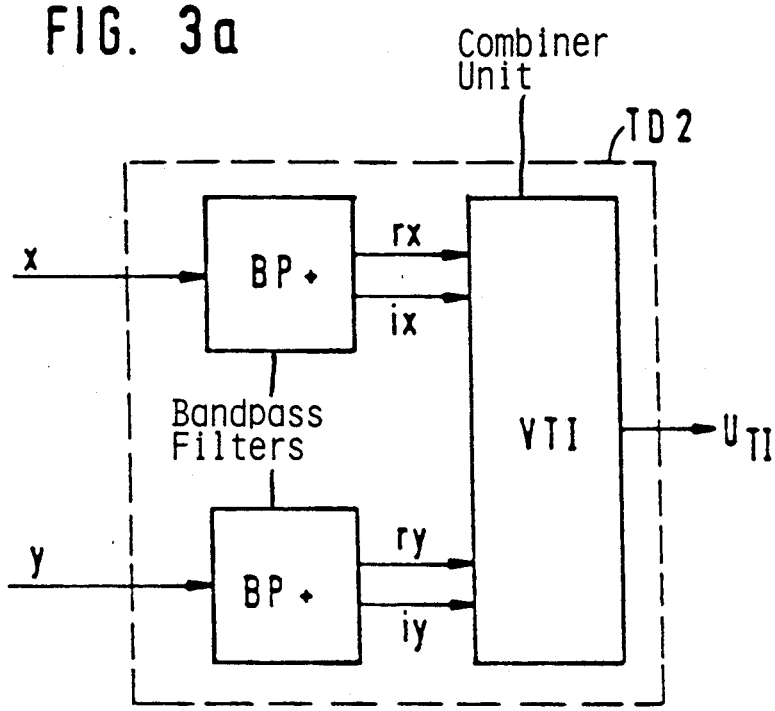
FIG. 3a shows a less expensive timing error detector and FIG. 3b shows a detailed linkage circuit.
Figure 3B:
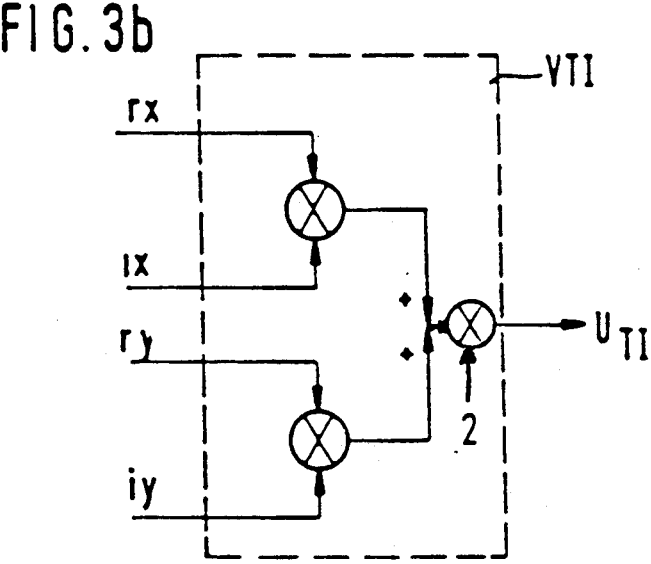

FIGS. 3a and 3b show a timing error detector which is less expensive than that of FIG. 2. It performs the same function as the first-mentioned phase detector TD1 and has been developed from it in that the symmetries of the two bandpass filters BP+ and BP− are utilized. Instead of these two symmetrical bandpass filters, two identical bandpass filters BP+ are now employed as shown in FIG. 3a, with the one receiving the real component x and the other the imaginary component y of the demodulated received signal. The two bandpass filters BP+ operate with a center frequency of $f_M=f_{Nyq}$ and generate the complex output values rx+jix and ry+jiy, respectively, which are linked in the connected linkage module (combining unit) VTI into a control signal $u_{TI}$ according to the equation $$u_{TI}=(rx \cdot ix + ry \cdot iy) \cdot 2,$$

with such a linkage being shown in FIG. 3b.

Figure 4:
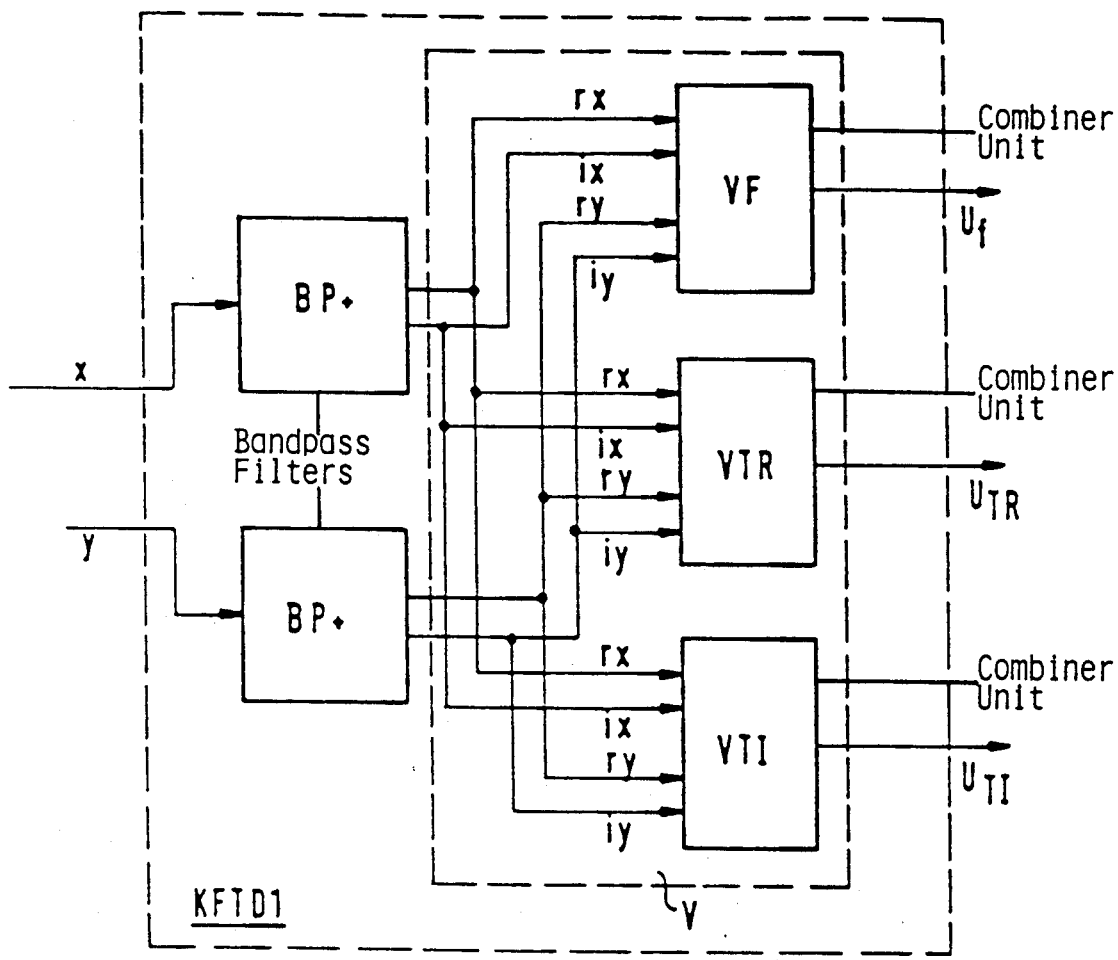
FIGS. 4 and 4A represent a detector circuit comprised of a timing error detector combined with a frequency detector, according to the invention.
Figure 4A:
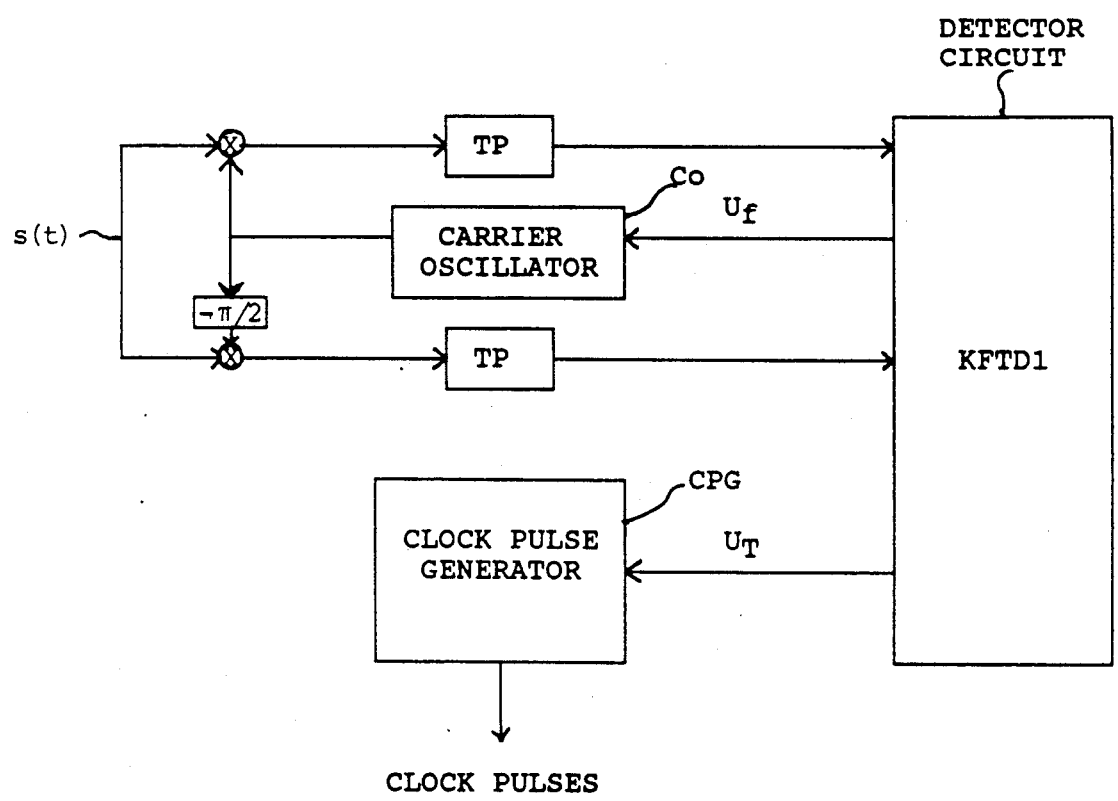
Figure 5A:
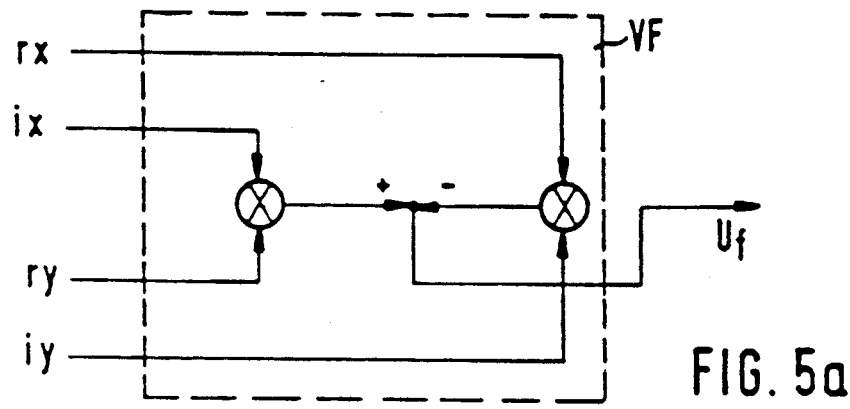

FIG. 4 now shows the inventive combination KFTD1 of a timing error detector with a frequency detector, with a further linkage circuit VF, shown in FIG. 5a, having been added to the timing error detector of FIG. 3a which also receives as its input signals the real components rx, ry and the imaginary components ix and iy of the output signals from the two complex bandpass filters BP+. The output value $u_f$ of the additional linkage circuit (combining unit) VF is a measure for the frequency offset between the local carrier and the transmitted carrier and controls the carrier oscillator CO as shown in FIG. 4A. The linkage circuit (combining unit) VTI to that of FIGS. 3a and 3b, respectively. A third linkage circuit (combining unit) VTR is added and generates a further control voltage $u_{TR}$ from the same input signals. This output value $u_{TR}$ can be interpreted as the real component of a complex timing error detector output signal $u_T=u_{TR}+ju_{TI}$ which controls the clock pulse generator CPG as shown in FIG. 4A. A combination of these two values into the above-mentioned complex timing error detector output signal $u_T$ leads to significant improvements in the acquisition of the clock pulse regulation.

Figure 5B:
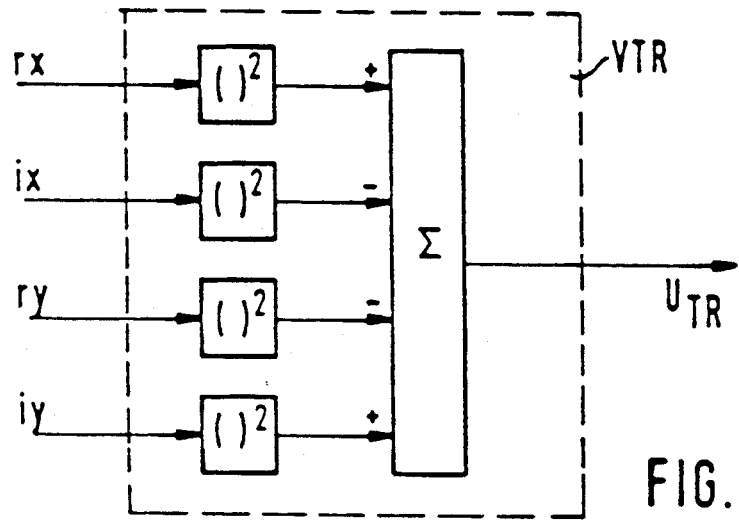
Figure 5C:
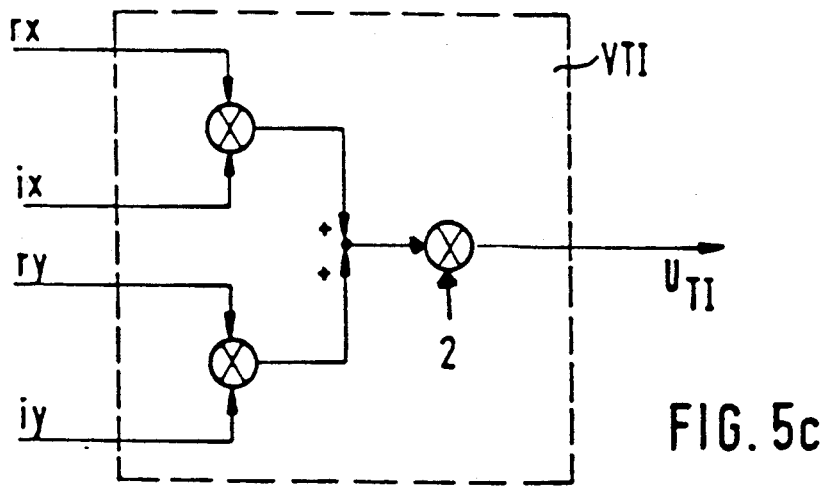

The mentioned detector output signals $u_f$, $u_{TR}$ and $u_{TI}$ from linkage module V meet the following equations:

$u_f = ry \cdot ix - rx \cdot iy$     (see FIGS. 5a);

$u_{TR} = rx^2 - ix^2 - ry^2 + iy^2$     (see FIG. 5b); and $u_{TI} = (rx \cdot ix + ry \cdot iy) \cdot 2$     (see FIG. 5c).

It must also be mentioned that the center frequency of bandpass filters BP+ is equal to the Nyquist frequency and that its bandwidth lies in an order of magnitude of the width of the Nyquist edge or is even somewhat narrower.

With suitable pre-equalization of the in-phase and the quadrature components of the demodulated received signal, the pattern jitter of the timing error detector and of the frequency detector can be totally suppressed. Pre-equalization is disclosed in Reference 2; however, the article by Franks and Bubrouski, entitled "Statistical Properties of Timing Jitter in a PAM Timing Recovery Scheme", IEEE Com.-22, No. 7, July, 1974, pages 913-920 (Reference 3) and the article by Andrea, Mengali and Moro, entitled "Nearly Optimum Prefiltering in Clock Recovery," in IEEE Com.-34, No. 11, November 1986, pages 1081-1088 (Reference 4) disclose how suitable pre-equalization can reduce the pattern jitter in the output of the timing error detector.

With a suitable design for pre-equalizers VE and bandpass filters BP+ it is now possible to meet the condition for jitter reduction in the frequency detector (see German Patent Application BK 87/11 (P3707762)) as well as the condition for jitter reduction in the timing error detector. The realizable jitter reduction depends on the quality of the equalization, i.e. on the width of the equalization band and on the deviation from its ideal course, and is thus a question of expenditures for pre-equalizer VE.

Figure 6:
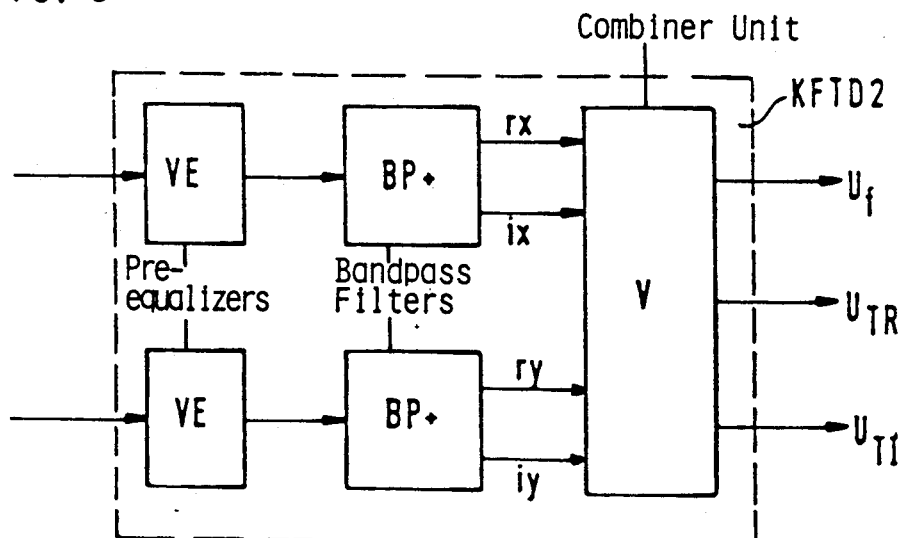
FIG. 6, finally, shows a timing error detector according to the invention with pre-equalization

FIG. 6 shows a combined frequency and timing error detector (KFTD2) in which, by means of pre-equalizers VE, the pattern jitter in the frequency detector output signal as well as in the output signal of the timing error detector is reduced.

Figure 7A:
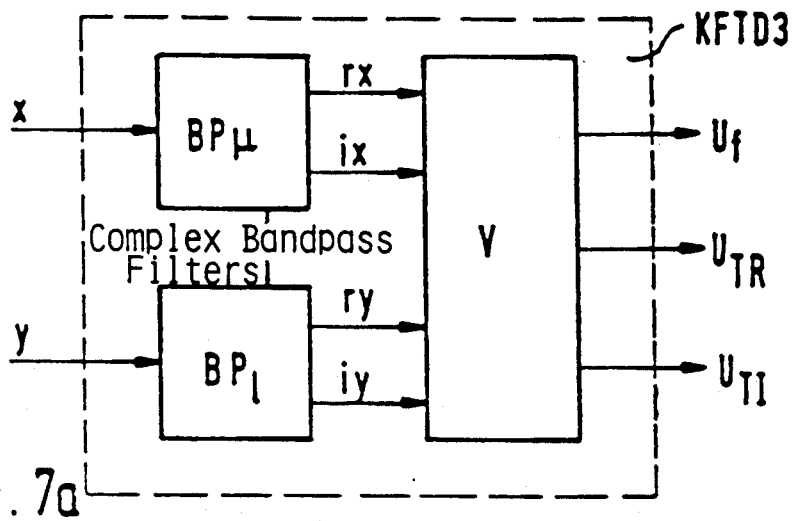
FIGS. 7a, 7b and 7c illustrate the integration of pre-equalization and bandpass filtering and complex pre-equalization, respectively.
Figure 7B:
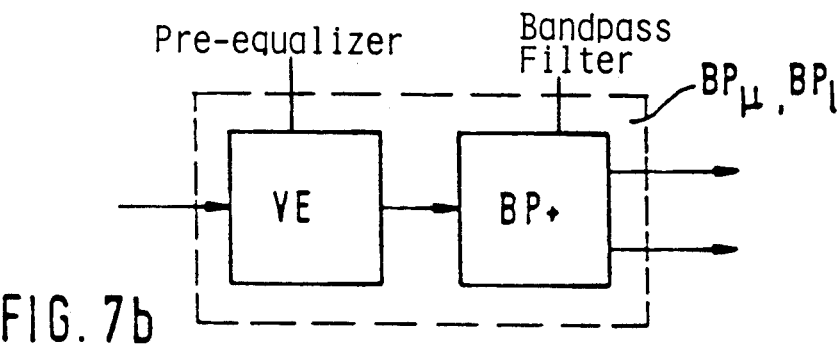
Figure 7C:
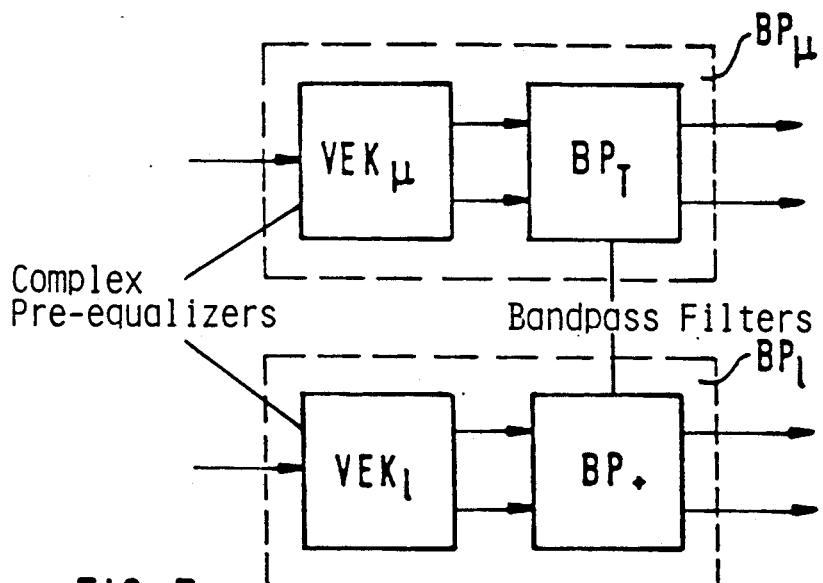

The pre-equalizers may be designed for real or complex pre-equalization. The pre-equalizers of both designs can be combined with the subsequent bandpass filter BP+ into a single complex filter. FIG. 7a shows the then resulting structure of the combined detector; the complex bandpass filters $BP_\mu$ and $BP_l$ result from a combination of a real pre-equalization with the subsequent bandpass filter BP+ shown in FIG. 7b or on the basis of a combination of the series connection of a complex pre-equalization $VEK_\mu$ and $VEK_l$, respectively, with subsequent bandpass filtering BP+ according to FIG. 7c.

We claim:

1. A detector circuit, including a timing error detector for use in synchronizing a clock pulse generated by a clock pulse generator in a receiver of synchronously transmitted data, the detector circuit comprising:

first and second bandpass filters for respectively receiving an in-phase component and a quadrature component of a demodulated received signal generated in the receiver from a product of a received signal and an output signal of a carrier oscillator, harmonics of a carrier frequency in the in-phase and quadrature components being suppressed;

a first combiner unit having means, responsive to outputs signals of said first and second bandpass filters and nondirected by any decision with respect to the transmitted data, for generating a first control signal to control the timing of the clock pulse generator; and a second combiner unit having means, responsive to the outputs signals of said first and second bandpass filters and nondirected by any decision with respect to the transmitted data, for generating a second control signal to control the frequency of the carrier oscillator.

2. Detector circuit according to claim 1, further comprising first and second pre-equalizers respectively provided ahead of said first and second bandpass filters, in which the demodulated received signal (x, y) is pre-equalized.

3. Detector circuit according to claim 1, wherein said first and second bandpass filters are respectively first and second complex filters having means for pre-equalizing the respective in-phase and quadrative components.

4. Detector circuit according to claim 1, wherein the bandpass filters each have a center frequency $f_M$ which is equal to the Nyquist frequency $f_{Nyq}$ and a frequency range of no greater than approximately the width of the Nyquist edge, with the Nyquist frequency $f_{Nyq} = \frac{1}{2} T_S$ where $T_s$ is a step duration for the transmitted symbols and the first bandpass filter is fed with the in-phase component x(t) and the second bandpass filter is fed with the quadrature component y(t) and the second combiner unit combines, for frequency control, output signals rx, ix, ry and iy of the first and second bandpass filters to obtain the second control signal $u_f$ according to the equation $$u_f = ry \cdot ix - rx \cdot iy.$$

5. Detector circuit according to claim 4, wherein the first combiner unit (VTI) combines the output signals rx, ix, ry and iy of the first and second bandpass filters to obtain the first control signal $u_{TI}$ according to the equation $$u_{TI} = (rx \cdot ix + ry \cdot iy) \cdot 2.$$

6. Detector circuit according to claim 5, wherein the third combiner unit combines the output signals rx, ix, ry and iy of the first and second bandpass filters to obtain the third control signal $u_{TR}$ according to the equation $$u_{TR} = rx^2 - ix^2 - ry^2 - iy^2.$$

7. Detector circuit according to claim 1, further comprising a third combiner unit which forms a third control signal $u_{TR}$ which, together with the first control signal $u_{TI}$, forms a complex control signal $u_T$ for the clock pulse generator.

8. A synchronous receiver, comprising:

means for demodulating a received input signal to obtain a demodulated signal having an in-phase component and a quadrature component, including:

a carrier oscillator having means for producing a carrier frequency signal, and means for multiplying the received input signal by the carrier frequency signal in-phase and in quadrature and suppressing harmonics of the carrier frequency therein to obtain the in-phase component and the quadrature component;

a clock pulse generator for generating a clock pulse; and a detector circuit, including:

first and second bandpass filters, respectively receiving the in-phase component and the quadrature component at their input ports and providing first and second filtered output signals at their output ports, a first combiner unit having an input port coupled to the output ports of the first and second bandpass filters for receiving the first and second filtered output signals, means, responsive to the first and second filtered signals and nondirected by any decision with respect to the transmitted data, for generating a first control signal, and an output port coupled to the clock pulse generator for providing the first control signal to the clock pulse generator to control the timing of the clock pulse generator in synchronism with the received signal, and a second combiner unit having an input port coupled to the output ports of the first and second bandpass filters for receiving the first and second filtered output signals, means, responsive to the first and second filtered signals and nondirected by any decision with respect to the transmitted data, for generating a second control signal, and an output port coupled to the carrier oscillating for providing the second control signal to the carrier oscillator to control the frequency of the carrier oscillator.

* * * * *